US008238270B2

United States Patent
Sugiyama (10) Patent No.: US 8,238,270 B2
(45) Date of Patent: Aug. 7, 2012

(54) COMMUNICATION SYSTEM, COMMUNICATION CONTROL DEVICE, COMMUNICATION METHOD, COMMUNICATION CONTROL METHOD AND RECORDING MEDIUM

(75) Inventor: Satoshi Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 430 days.

(21) Appl. No.: 12/536,767

(22) Filed: Aug. 6, 2009

(65) Prior Publication Data

US 2010/0202600 A1    Aug. 12, 2010

(30) Foreign Application Priority Data

Aug. 29, 2008   (JP) .................................. 2008-221144

(51) Int. Cl.
*H04M 3/42*       (2006.01)
(52) U.S. Cl. .................. 370/271; 370/395.2; 379/93.01; 379/243
(58) Field of Classification Search .................. None
See application file for complete search history.

(56) References Cited

U.S. PATENT DOCUMENTS

| 6,353,663 | B1 | 3/2002 | Stevens et al. |
| 2005/0025296 | A1* | 2/2005 | Benco et al. ............... 379/88.22 |
| 2007/0099600 | A1 | 5/2007 | Patterson et al. |
| 2007/0208798 | A1* | 9/2007 | Kagawa et al. ............... 709/201 |

FOREIGN PATENT DOCUMENTS

| EP | 1898614 A | 3/2008 |
| JP | 2001103551 A | 4/2001 |
| WO | 2007030951 A | 3/2007 |

* cited by examiner

*Primary Examiner* — Andrew Lai
*Assistant Examiner* — Alex Skripnikov (57) ABSTRACT

A communication control device executes a call-out process of calling out a recipient telephone device while specifying an importance level via a telephone network in response to a request from a transmitter telephone device. A recipient received a call operates a mobile communication terminal after a telephone call ends, accesses an information providing server via a wireless LAN access point and the Internet, and inputs information evaluating whether or not an importance level specified for the received call is appropriate. The information providing server provides the input evaluation information to a storage device. The communication control device determines whether or not to execute a call-out process based on the evaluation information stored in the storage device when there is a call-out request from a transmitter.

5 Claims, 8 Drawing Sheets

EVALUATION INFORMATION DB 530

| PHONE NUMBER | COMPREHENSIVE EVALUATION INFORMATION |
|---|---|

NUMBER OF CALLABLE TIMES TABLE 531

| COMPREHENSIVE EVALUATION FOR TRANSMITTER (PER MONTH) | NUMBER OF CALLABLE TIMES (PER MONTH) |
|---|---|
| GREATER THAN OR EQUAL TO +4 POINTS | UNRESTRAINT |
| +1 TO +3 POINTS | 28 TIMES |
| 0 | 13 TIMES |
| −2 TO −1 POINT | 4 TIMES |
| LESS THAN OR EQUAL TO −3 POINTS | 0 TIME |

FIG. 8B

CALLING RATE TABLE 532

| COMPREHENSIVE EVALUATION FOR TRANSMITTER (PER MONTH) | CALLING RATE/MINUTE |
|---|---|
| GREATER THAN OR EQUAL TO +4 POINTS | 1 YEN |
| +1 TO +3 POINTS | 3 YEN |
| 0 | 5 YEN |
| −2 TO −1 POINT | 7 YEN |
| LESS THAN OR EQUAL TO −3 POINTS | OUT OF SERVICE |

COMMUNICATION SYSTEM, COMMUNICATION CONTROL DEVICE, COMMUNICATION METHOD, COMMUNICATION CONTROL METHOD AND RECORDING MEDIUM

INCORPORATION BY REFERENCE

This application is based on Japanese Patent Application No. 2008-221144 filed on Aug. 29, 2008 and including specification, claims, drawings and summary. The disclosure of the above Japanese Patent Application is incorporated herein by reference in its entirety.

TECHNICAL FIELD

The present invention relates to a communication system, a communication control device, a communication method, a communication control method and a recording medium which are suitable for suppressing any abusing of importance level setting of a telephone call subject.

BACKGROUND ART

In a mobile communication system which enables mobile communication terminals like cellular phones to communicate with each other, there has been proposed a technology of notifying information indicating an importance level set by a call-transmitting user (hereinafter, "transmitter") together with a transmission-originating phone number to a call-receiving user (hereinafter, "recipient"). For example, according to a mobile communication terminal disclosed in Unexamined Japanese Patent Application KOKAI Publication No. 2001-103551, when a transmitter enters a phone number that the transmitter wishes to call, a security code and a priority information identification code are entered following to a transmission-destination phone number. Accordingly, a calling setting message having calling control information to which information element like priority information is added is transmitted over a communication network.

However, such importance setting function of a mobile communication terminal may be abused. For example, some traders carrying out sales, soliciting and the like may make a phone call while setting the importance level high in order to attempt a recipient to answer the phone. If the importance level is always set high when the recipient receives a call which is not important to the recipient, the recipient stops believing the set importance. Hence, if the importance setting level is abused, the function of the importance level setting may not be effectively used. Therefore, there is a demand for a technology which suppresses any abusing of importance level setting of a telephone call subject.

SUMMARY

The present invention has been made in order to overcome such a problem, and it is an exemplary object of the present invention to provide a communication system, a communication control device, a communication method, a communication control method, and a recording medium which are suitable for suppressing any abusing of importance level setting of a telephone call subject.

In order to achieve the object, a communication system according to the first exemplary aspect of the invention includes a communication control device which executes a predetermined process of calling out a recipient telephone device via a telephone network while specifying an importance level in response to a request from a transmitter telephone device, a storage device which is connected to the communication control device, and which is referred by the communication control device, and an information providing server which is connected to the storage device and which provides information to the storage device, and wherein:

the information providing server is connected to the recipient telephone device via a data communication network;

the storage device stores information, identifying the transmitter telephone device and transmitted from the information providing server, and evaluation information, indicating an appropriateness of an importance level specified for a transmission from the transmitter telephone device, the former information and the evaluation information being stored in association with each other;

the communication control device includes:
    a call-out request receiving unit which receives a call-out request from the transmitter telephone device, the call-out request including an importance level of a call subject and identification information identifying the transmitter telephone device and the recipient telephone device;
    a determination unit which acquires evaluation information associated with identification information of the transmitter telephone device from the storage device, and determines whether or not the transmitter telephone device satisfies a predetermined condition based on the evaluation information; and
    a call-out process executing unit which executes, while specifying the importance level, a predetermined process of calling out the recipient telephone device identified by the identification information contained in the call-out request when it is determined that the transmitter telephone device satisfies the predetermined condition, the information providing server includes:
    an evaluation information receiving unit which receives evaluation information indicating the appropriateness of the specified importance level and information identifying the transmitter telephone device from the recipient telephone device after the recipient telephone device responds to a call-out whose importance level is specified and a call is established; and
    an evaluation information transmitting unit which transmits the received evaluation information and the received identification information of the transmitter telephone device to the storage device.

In order to achieve the object, a communication control device according to a second exemplary aspect of the present invention executes a predetermined process of calling out a recipient telephone device while specifying an importance level via a telephone network in response to a request from a transmitter telephone device, and the communication control device includes:

a call-out request receiving unit which receives a call-out request from the transmitter telephone device, the call-out request including an importance level of a call subject and identification information identifying the transmitter telephone device and the recipient telephone device;

a determination unit which acquires evaluation information associated with identification information of the transmitter telephone device from a storage device connected to the communication control device, and determines whether or not the transmitter telephone device satisfies a predetermined condition on the basis of the evaluation information; and a call-out process executing unit which executes, while specifying the importance level, a predetermined process of calling out the recipient telephone device identified by identification information contained in the call-out request when it is determined that the transmitter telephone device satisfies the predetermined condition.

In order to achieve the object, a communication system according to the third exemplary aspect of the invention includes a communication control device which executes a predetermined process of calling out a recipient telephone device via a telephone network while specifying an importance level in response to a request from a transmitter telephone device, a storage device which is connected to the communication control device, and which is referred by the communication control device, and an information providing server which is connected to the storage device and which provides information to the storage device, and wherein:

the information providing server is connected to the recipient telephone device via a data communication network;

the storage device stores information, identifying the transmitter telephone device and transmitted from the information providing server, and evaluation information, indicating an appropriateness of an importance level specified for a transmission from the transmitter telephone device, the former information and the evaluation information being stored in association with each other;

the communication control device includes:
a call-out request receiving means which receives a call-out request from the transmitter telephone device, the call-out request including an importance level of a call subject and identification information identifying the transmitter telephone device and the recipient telephone device;
a determination means which acquires evaluation information associated with identification information of the transmitter telephone device from the storage device, and determines whether or not the transmitter telephone device satisfies a predetermined condition based on the evaluation information; and
a call-out process executing means which executes, while specifying the importance level, a predetermined process of calling out the recipient telephone device identified by the identification information contained in the call-out request when it is determined that the transmitter telephone device satisfies the predetermined condition, the information providing server includes:
an evaluation information receiving means which receives evaluation information indicating the appropriateness of the specified importance level and information identifying the transmitter telephone device from the recipient telephone device after the recipient telephone device responds to a call-out whose importance level is specified and a call is established; and
an evaluation information transmitting means which transmits the received evaluation information and the received identification information of the transmitter telephone device to the storage device.

In order to achieve the object, a communication control device according to a fourth exemplary aspect of the present invention executes a predetermined process of calling out a recipient telephone device while specifying an importance level via a telephone network in response to a request from a transmitter telephone device, and the communication control device includes:

a call-out request receiving means which receives a call-out request from the transmitter telephone device, the call-out request including an importance level of a call subject and identification information identifying the transmitter telephone device and the recipient telephone device;

a determination means which acquires evaluation information associated with identification information of the transmitter telephone device from a storage device connected to the communication control device, and determines whether or not the transmitter telephone device satisfies a predetermined condition on the basis of the evaluation information; and a call-out process executing means which executes, while specifying the importance level, a predetermined process of calling out the recipient telephone device identified by identification information contained in the call-out request when it is determined that the transmitter telephone device satisfies the predetermined condition.

In order to achieve the object, a communication method according to a fifth exemplary aspect of the present invention is executed by a communication system including a communication control device which executes a predetermined process of calling out a recipient telephone device while specifying an importance level via a telephone network in response to a request from a transmitter telephone device, a storage device which is connected to the communication control device and which is referred by the communication control device, and an information providing server which is connected to the storage device and which provides information to the storage device, wherein:

the information providing server is connected to the recipient telephone device via a data communication network; and the storage device stores information, transmitted from the information providing server and identifying the transmitter telephone device, and evaluation information for a transmission from the transmitter telephone device, in association with each other, and the communication method includes:

in the communication control device,
a call-out request receiving step in which a call-out request receiving unit receives a call-out request from the transmitter telephone device, the call-out request including an importance level of a call subject, and identification information identifying the transmitter telephone device and the recipient telephone device;
a determination step in which a determination unit acquires evaluation information associated with identification information of the transmitter telephone device from the storage device, and determines whether or not the transmitter telephone device satisfies a predetermined condition on the basis of the evaluation information; and
a call-out process executing step in which a call-out process executing unit executes, while specifying the importance level, a predetermined process of calling out the recipient telephone device identified by identification information contained in the call-out request when it is determined that the transmitter telephone device satisfies the predetermined condition; and in the information providing server,
an evaluation information receiving step in which an evaluation information receiving unit receives evaluation information indicating the appropriateness of the specified importance level and information identifying the transmitter telephone device from the recipient telephone device after the recipient telephone device responds to a call-out whose importance level is specified and a call is established; and an evaluation information transmitting step in which an evaluation information transmitting unit transmits the received evaluation information and the received identification information identifying the transmitter telephone device to the storage device.

In order to achieve the object, a communication control method according to a sixth exemplary aspect of the present invention is executed by a communication control device which executes a predetermined process of calling out a recipient telephone device while specifying an importance level via a telephone network in response to a request from a transmitter telephone device, the method includes:

a call-out request receiving step in which a call-out request receiving unit receives a call-out request from the transmitter telephone device, the call-out request including an importance level of a call subject and identification information identifying the transmitter telephone device and the recipient telephone device;

a determination step in which a determination unit receives evaluation information associated with identification information of the transmitter telephone device from a storage device connected to the communication control device, and determines whether or not the transmitter telephone device satisfies a predetermined condition on the basis of the evaluation information; and a call-out process executing step in which a call-out process executing unit executes, while specifying the importance level, a predetermined process of calling out the recipient telephone device identified by identification information contained in the call-out request when it is determined that the transmitter telephone device satisfies the predetermined condition.

In order to achieve the object, a recording medium according to a seventh exemplary aspect of the present invention stores a program that allows a computer to function as a communication control device which executes a predetermined process of calling out a recipient telephone device while specifying an importance level via a telephone network in response to a request from a transmitter telephone device, wherein the program allows the computer to function as:

a call-out request receiving unit which receives a call-out request from the transmitter telephone device, the call-out request including an importance level of a call subject, and identification information identifying the transmitter telephone device and the recipient telephone device;

a determination unit which receives evaluation information associated with identification information of the transmitter telephone device from a storage device connected to the computer, and determines whether or not the transmitter telephone device satisfies a predetermined condition on the basis of the evaluation information; and a call-out process executing unit which executes, while specifying the importance level, a predetermined process of calling out the recipient telephone device identified by identification information contained in the call-out request when it is determined that the transmitter telephone device satisfies the predetermined condition.

According to the present invention, it is possible to provide a communication system, a communication control device, a communication method, a communication control method and a recording medium which are suitable for suppressing any abusing of importance level setting of a telephone call subject.

BRIEF DESCRIPTION OF THE DRAWINGS

The object and other objects and advantages of the present invention will become more apparent upon reading of the following detailed description and the accompanying drawings in which.

EXEMPLARY EMBODIMENT

An explanation will be given of a communication system for mobile communication terminals according to an exemplary embodiment of the present invention.

Figure 1:
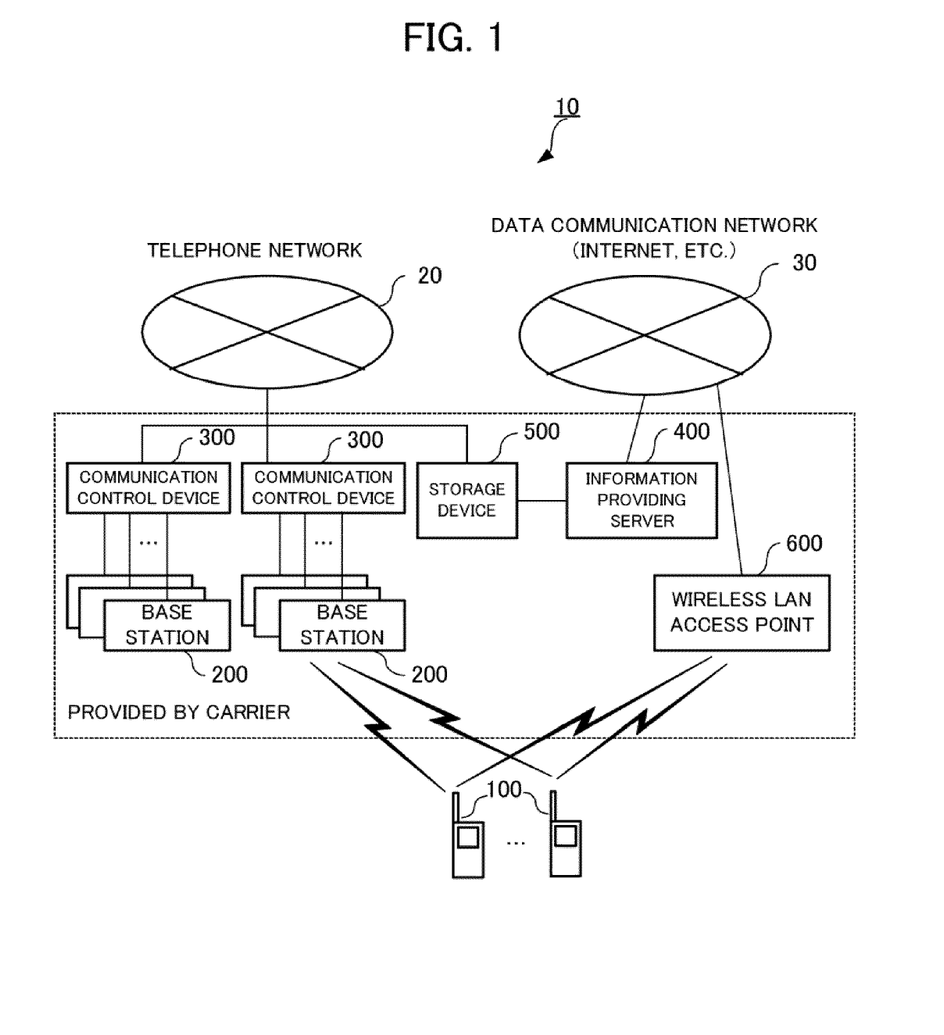
FIG. 1 is a block diagram showing a general example structure of a mobile communication system according to an embodiment of the present invention.

FIG. 1 is a diagram showing major structural components of a communication system according to the embodiment. In a communication system 10 of the embodiment, as shown in FIG. 1, is communication common carrier (i.e., a so-called carrier) provides a portion surrounded by a dashed line. The carrier manages plural communication control devices 300. Each communication control device 300 is connected to plural base stations 200. Plural mobile communication terminals 100 each communicates with an adjacent base station 200 via wireless communication. Note that carriers themselves are connected together via a telephone network 20 included of, for example, public lines.

In the embodiment, a mobile communication terminal 100 performs wireless communication with an adjacent base station 200, and transmits importance level information of a telephone call subject set by a transmitter together with sound data.

The sound data and the importance level information are transmitted to the telephone network 20 via the base station 200 and the communication control device 300. Thereafter, the sound data and the importance level information are delivered to a call receiving mobile communication terminal 100 via the communication control device 300 and the base station 200 both managed by a carrier that provides a service to the call receiving mobile communication terminal 100. At this time, the communication control device 300 acquires information necessary for a communication from a storage device 500.

On the other hand, the mobile communication terminal 100 is also connected to a data communication network 30 like the Internet via a wireless LAN access point 600. A recipient who receives an incoming call operates the mobile communication terminal 100 after a phone call is completed to access an information providing server 400 via the data communication network 30. The recipient enters information (evaluation information) for evaluating whether or not the importance level of a telephone call subject specified by the receiving call is appropriate. The information providing server 400 provides the entered evaluation information to the storage device 500. The communication control device 300 determines whether or not to execute a predetermined process for establishing a communication based on the provided evaluation information when there is a call-out request from a call transmitting side.

Next, an explanation will be given of individual major structural component of the communication system 10 realizing the foregoing function.

Figure 2:
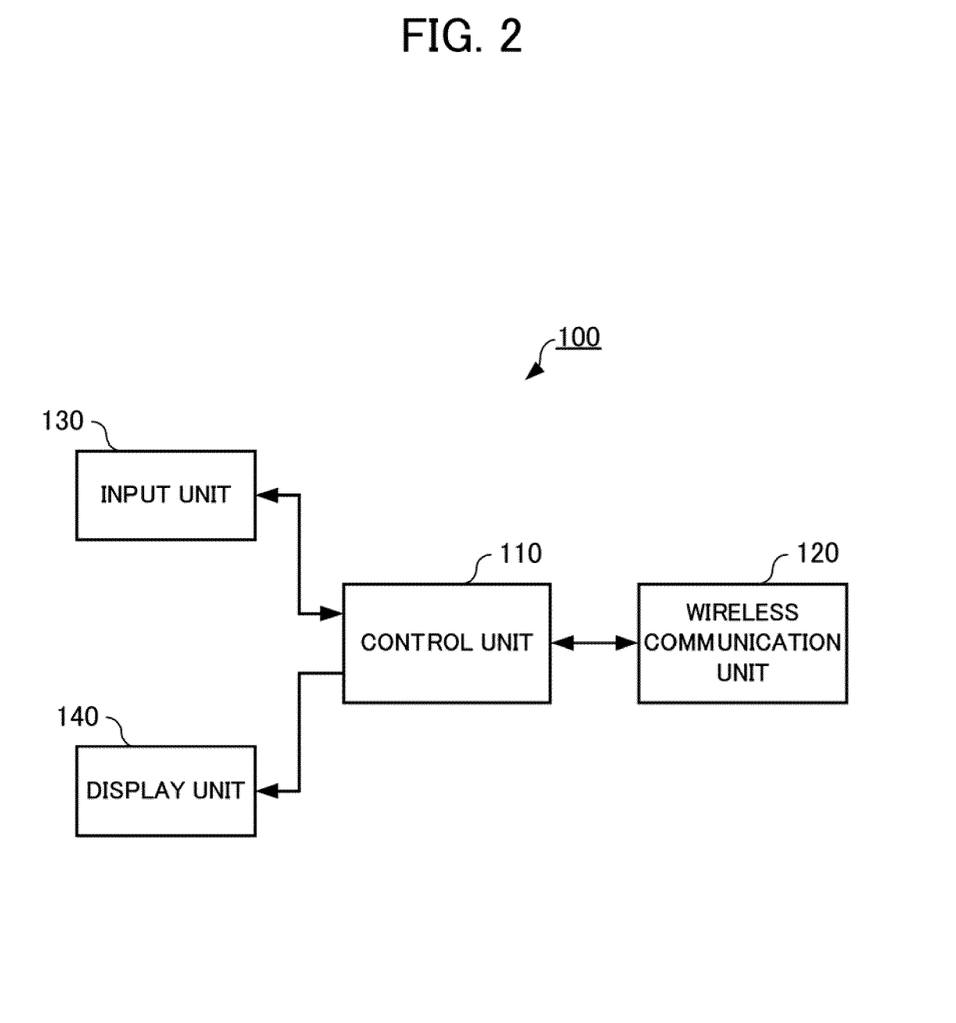
FIG. 2 is a diagram showing a general example structure of a mobile communication terminal of the embodiment.

As shown in FIG. 2, the mobile communication terminal 100 has a control unit 110, a wireless communication unit 120, an input unit 130, and a display unit 140.

The control unit 110 has a CPU (Central Processing Unit) (not shown), a ROM (Read Only Memory) (not shown), a RAM (Random Access Memory) (not shown), and the like, and controls the whole mobile communication terminal 100. More specifically, as the CPU executes a control program stored in the ROM, the CPU executes a control/computation process. At the time of control/computation process, the CPU uses the RAM as a work area, and temporarily stores various data in the RAM.

Note that the mobile communication terminal 100 may have a storage unit and the control program may be stored in the storage unit, not in the ROM.

The wireless communication unit 120 includes, for example, a wireless communication device for mobile communication, and an antenna. The wireless communication unit 120 controls transmission/reception of a radio wave with the base station 200, thereby communicating with the base station 200 for verbal communication.

Moreover, the wireless communication unit 120 has a wireless communication device compatible with a wireless LAN standard like IEEE802.11. Accordingly, the wireless communication unit 120 performs data communication with the wireless LAN access point 600.

The input unit 130 includes buttons and keys provided on an external surface of the mobile communication terminal 100, and is operated by a user of the mobile communication terminal 100. The input unit 130 has an input circuit connected to each button or key, creates an input signal corresponding to an operation by the user, and outputs the input signal to the control unit 110.

The display unit 140 is a display output device including, for example, a liquid crystal display device. The display unit 140 displays and outputs a text, a motion picture or the like under the control of the control unit 110.

The base station 200 performs wireless communication with the mobile communication terminal 100, and relays a communication between the mobile communication terminal 100 and the communication control device 300. Typically, a hierarchical structure that the plural base stations 200 are connected to a non-illustrated base station control device and the plural base station control devices are connected to a communication control device 300 is employed. The base station 200 has a wireless communication unit for wireless communication with the mobile communication terminal 100 and a communication unit to communicate with the communication control device 300.

The communication control device 300 is typically connected to the telephone network 20 via a non-illustrated gateway switch. When receiving a call request from a transmitter mobile communication terminal device 100, the communication control device 300 performs a predetermined process of specifying a carrier for a recipient mobile communication terminal 100, and a communication control device 300 which manages an area where the recipient mobile communication terminal 100 is present. The communication control device 300 executes a predetermined process of transmitting a call-out request to the specified communication control device 300 to call out the recipient mobile communication terminal 100. Moreover, when receiving a call-out request from another communication control device 300, the communication control device 300 performs a connection process to establish a connection with a mobile communication terminal 100 specified by the received call-out request via base station 200.

Figure 3A:
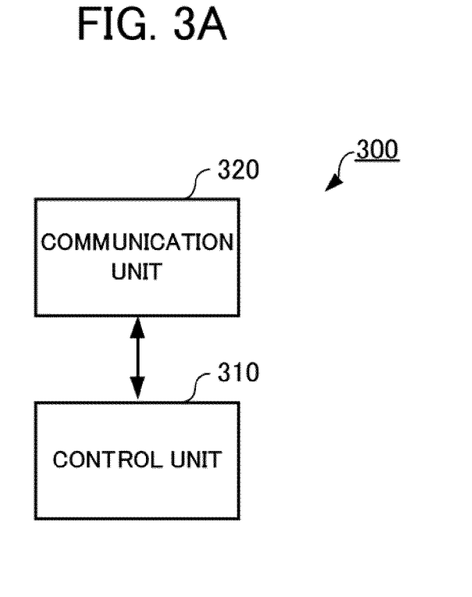
FIG. 3A is a diagram showing a general example structure of a communication control device of the embodiment.

The communication control device 300 having the foregoing function has, as shown in FIG. 3A, a control unit 310 and a communication unit 320.

The control unit 310 has a CPU (not shown), a ROM (not shown), a RAM (not shown), and the like, and controls the whole communication control device 300. More specifically, as the CPU executes a control program stored in the ROM etc., the CPU executes a control/computation process. At the time of control/computation process, the CPU uses the RAM as a work area, and temporarily stores various data in the RAM.

The communication unit 320 has a communication interface, and communicates with the information providing server 400.

In the embodiment, the communication unit 320 functions as a call-out request receiving unit. The control unit 310 functions as a determination unit and a call-out process executing unit.

Figure 3B:
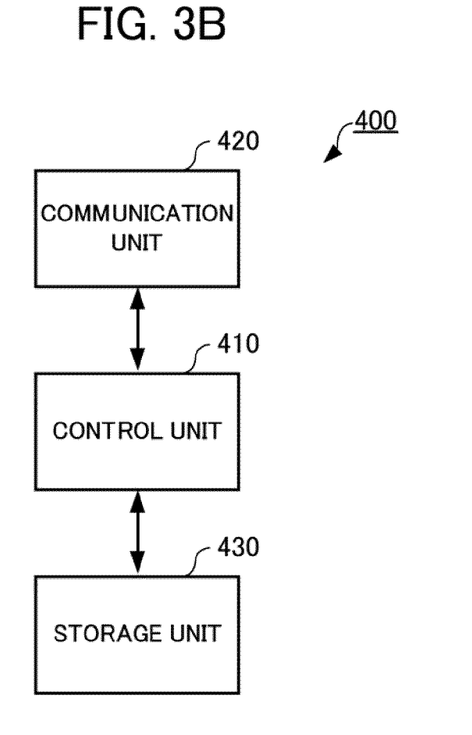
FIG. 3B is a diagram showing a general example structure of a information providing server of the embodiment.

The information providing server 400 provides an application accessible via the data communication network 30 to a terminal device (including the mobile communication terminal 100) connectable to the data communication network 30. The information providing server 400 has, as shown in FIG. 3B, a control unit 410, a communication unit 420, a storage unit 430.

The control unit 410 has a CPU (Central Processing Unit) (not shown), a ROM (Read Only Memory) (not shown), a RAM (Random Access Memory) (not shown), and the like, and controls the whole information providing server 400. More specifically, as the CPU executes a control program stored in the ROM or the storage unit 430 to be discussed later, the CPU executes a control/computation process. At the time of control/computation process, the CPU uses the RAM as a work area, and temporarily stores various data in the RAM.

The communication unit 420 has a communication interface etc. The communication unit 420 transmits/receives various information with the mobile communication terminal 100 via the data communication network 30 based on a protocol like TCP/IP for example.

The storage unit 430 includes a large-capacity storage device like a hard disk drive, and stores an application server program or the like. In accordance with such an application server program, the control unit 410 provides an application accessible via the data communication network 30.

Note that in the embodiment, the control unit 410 and the communication unit 420 work together to function as an evaluation information receiving unit, an evaluation information transmitting unit and the like.

The storage device 500 shown in FIG. 1 is a database server like a so-called home location register. The storage device 500 stores all information necessary for providing a service to a subscriber who subscribes a mobile communication service provided by a carrier. The storage device 500 is connected to all communication control devices 300 managed by a carrier through a communication unit (not shown), and provides information necessary for a communication to a communication control device 300. The storage device 500 is also connected to the information providing server 400 through the communication unit. The storage device 500 stores information collected by the information providing server 400, and provides such information to a communication control device 300.

Figure 4:
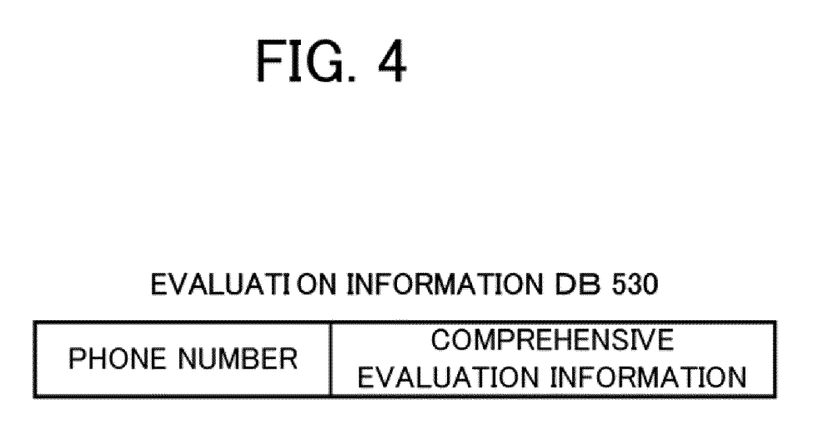
FIG. 4 is a diagram showing an example structure of an evaluation information DB that a storage device has.

Typically, as a non-illustrated control unit executes a program stored in a non-illustrated storage unit, the storage device 500 functions as a database server. At this time, the storage device 500 stores a subscriber phone number, a unique identification number of a mobile communication terminal, positional information of the mobile communication terminal, and billing data in association with one another. As shown in FIG. 4, the storage device 500 functions as an evaluation information DB 530 which stores comprehensive evaluation information for all subscriber phone numbers managed by a carrier.

The comprehensive evaluation information is information for evaluating whether or not the importance level of a subject specified by a subscriber is appropriate for a call made by the subscriber. The comprehensive evaluation information reflects evaluation from individual recipients who received a call. For example, a recipient evaluates an importance level as "appropriate", "inappropriate", and the like. For example the comprehensive evaluation information is represented by a total point indicating evaluation results by the individual recipients with an evaluation "appropriate" being +1 point and an evaluation "inappropriate" being −1 point. Note that the comprehensive evaluation information is information that indicates a comprehensive evaluation.

The wireless LAN access point 600 includes a wireless communication device compatible with a wireless LAN standard like IEEE802.11, and establishes a wireless connection with the mobile communication terminal 100. The wireless LAN access point 600 is connected to the data communication network 30 via, for example, a base station control device, a packet access control node, and a packet gateway node (all not shown), and enables a data communication between the mobile communication terminal 100 and a device connected to the Internet.

Next, an explanation will be given of an operation of the communication system 10 having the foregoing structure.

(Transmission Process)

A process that a transmitter mobile communication terminal 100 calls out a recipient mobile communication terminal 100 will be explained with reference to FIG. 5.

A transmitter operates the input unit 130 of the mobile communication terminal 100, and inputs necessary information for transmission. As the transmitter inputs a phone number that the transmitter wishes to call (step S100), the control unit 110 displays a screen enabling a setting of the importance level of a call subject on the display unit 140 (step S101). The transmitter inputs the importance level in accordance with a screen instruction when desiring to specify the importance level (step S102). Next, as the transmitter operates the input unit 130 to instruct a transmission (step S103), the control unit 110 of the mobile communication terminal 100 transmits a call-out request, including its phone number (typically, stored in a non-illustrated removable memory (ROM card)), a specified recipient phone number and importance level information, to the closest base station 200 (step S104).

The base station 200 relays the received call-out request, and transmits such a request to a communication control device 300 (step S105). Next, as the control unit 310 of the communication control device 300 receives the call-out request, the control unit 310 of the communication control device 300 determines whether or not the transmitter mobile communication terminal 100 satisfies a predetermined condition (step S106). The predetermined condition and the detail of this process will be explained in the following "transmission process based on comprehensive evaluation information".

When determining that the predetermined condition is not satisfied (step S106: NO), the communication control device 300 terminates the process. At this time, the communication control device 300 may execute a process of notifying the transmitter mobile communication terminal 100 that the transmission is not available. Conversely, when determining that the predetermined condition is satisfied (step S106: YES), the communication control device 300 specifies a communication control device 300 located at an area where the recipient mobile communication terminal 100 is present (step S107). The communication control device 300 transmits a call-out request to the specified communication control device 300 while specifying the phone number of the transmitter, the importance level information, and the phone number of the recipient (step S108).

The control unit 310 of the recipient-side communication control device 300 calls out the recipient mobile communication terminal 100 via a base station 200 in response to the received call-out request (step S108). At this time, the communication control device 300 transmits the phone number of the transmitter and the importance level of the call subject to the mobile communication terminal 100. The called-out mobile communication terminal 100 displays the received transmitter phone number and the received importance level information of the call subject on the display unit 104 (step S109). In this condition, as the recipient inputs an instruction to respond to a call-out and receives a call, a telephone call between the transmitter and recipient mobile communication terminal 100 becomes possible. Note that the control unit 110 of the recipient mobile communication terminal 100 temporarily stores the received transmitter phone number in the RAM or the like to use such a number in the following process.

(Registration Process of Evaluation Information)

Figure 6:
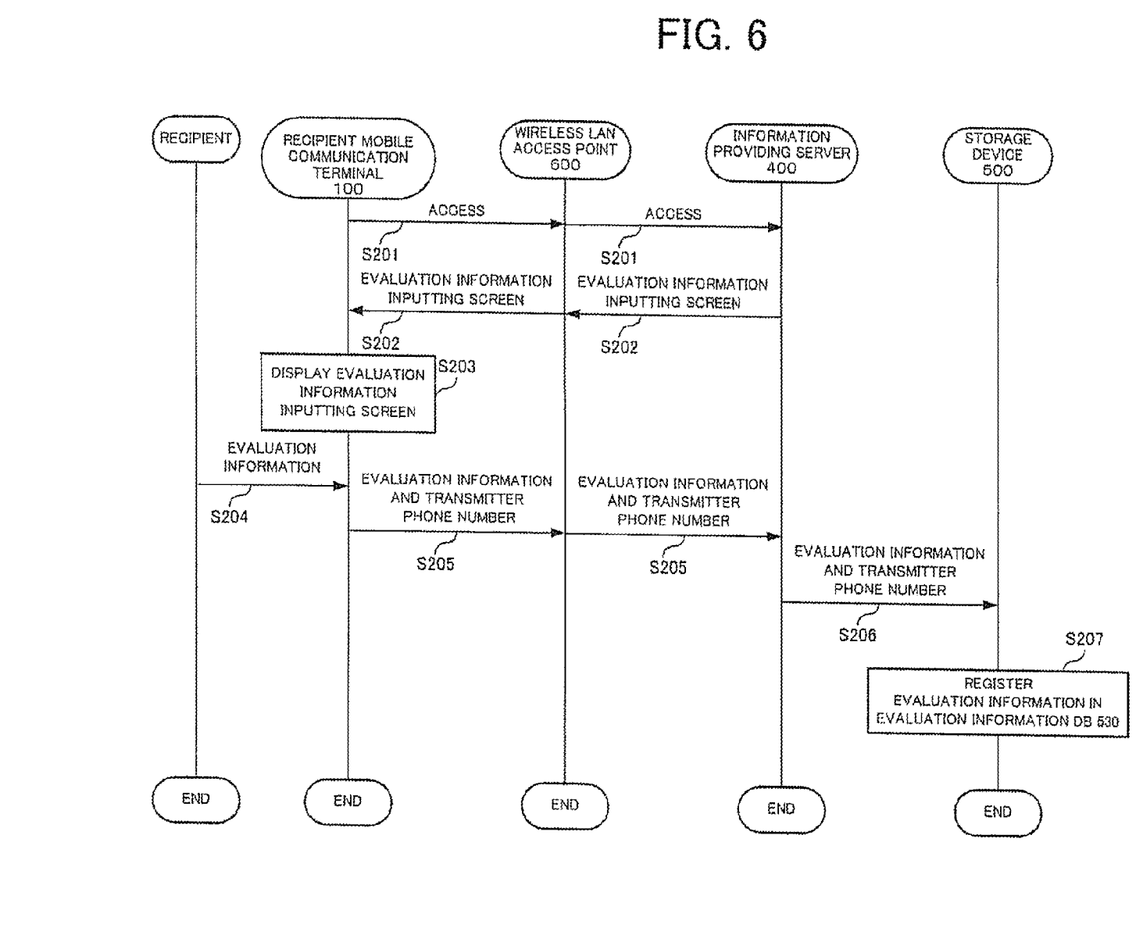
FIG. 6 is a flowchart showing a registration process for evaluation information.

Next, a process of registering evaluation information will be explained with reference to FIG. 6. When a telephone call ends, and a connection is disconnected, the control unit 110 of the recipient mobile communication terminal 100 accesses a predetermined address (e.g., a URL (Uniform Resource Locator)) provided by the information providing server 400 via the wireless LAN access point 600 and the data communication network 30 (step S201). The information providing server 400 creates predetermined screen information enabling inputting of evaluation information for evaluating whether or not the importance level specified for the telephone call is appropriate, in response to the accessing, and transmits such information to the recipient mobile communication terminal 100 (step S202). The display unit 140 of the mobile communication terminal 100 displays the received evaluation information inputting screen (step S203).

The recipient inputs evaluation information (e.g., "appropriate", "inappropriate") in accordance with the displayed screen information, and instructs transmission of the evaluation information (step S204). The recipient mobile communication terminal 100 transmits the input evaluation information and the phone number stored in the RAM to the information providing server 400 (step S205). The information providing server 400 temporarily stores the received evaluation information and the transmitter phone number in the RAM or the like, and transmits those temporarily stored information to the storage device 500 at a predetermined timing (e.g., at a predetermined time interval or at a predetermined time) (step S206).

The storage device 500 adds a point indicating the received evaluation information (e.g., +1 point for "appropriate" and −1 point for "inappropriate") to comprehensive evaluation information associated with the received phone number, and registers such information in the evaluation information DB 530 (step S207). Accordingly, the higher the point is (i.e., if the number of evaluation "appropriate" is greater than the number of evaluation "inappropriate"), the better the comprehensive evaluation becomes. The registration process of evaluation information is then terminated.

Note that in the embodiment, evaluation information indicated by a predetermined value is added to create comprehensive evaluation information, but how to acquire the comprehensive evaluation information is not limited to this scheme. For example, evaluation "appropriate" or "inappropriate" may be multiplied by a predetermined weight, and then may be added together. Alternatively, the number of evaluation "inappropriate" (or "appropriate") may be collected, and comprehensive evaluation may be deemed as good if the number of such evaluation is few (or large).

(Transmission Process Based on Comprehensive Evaluation Information)

Figure 5:
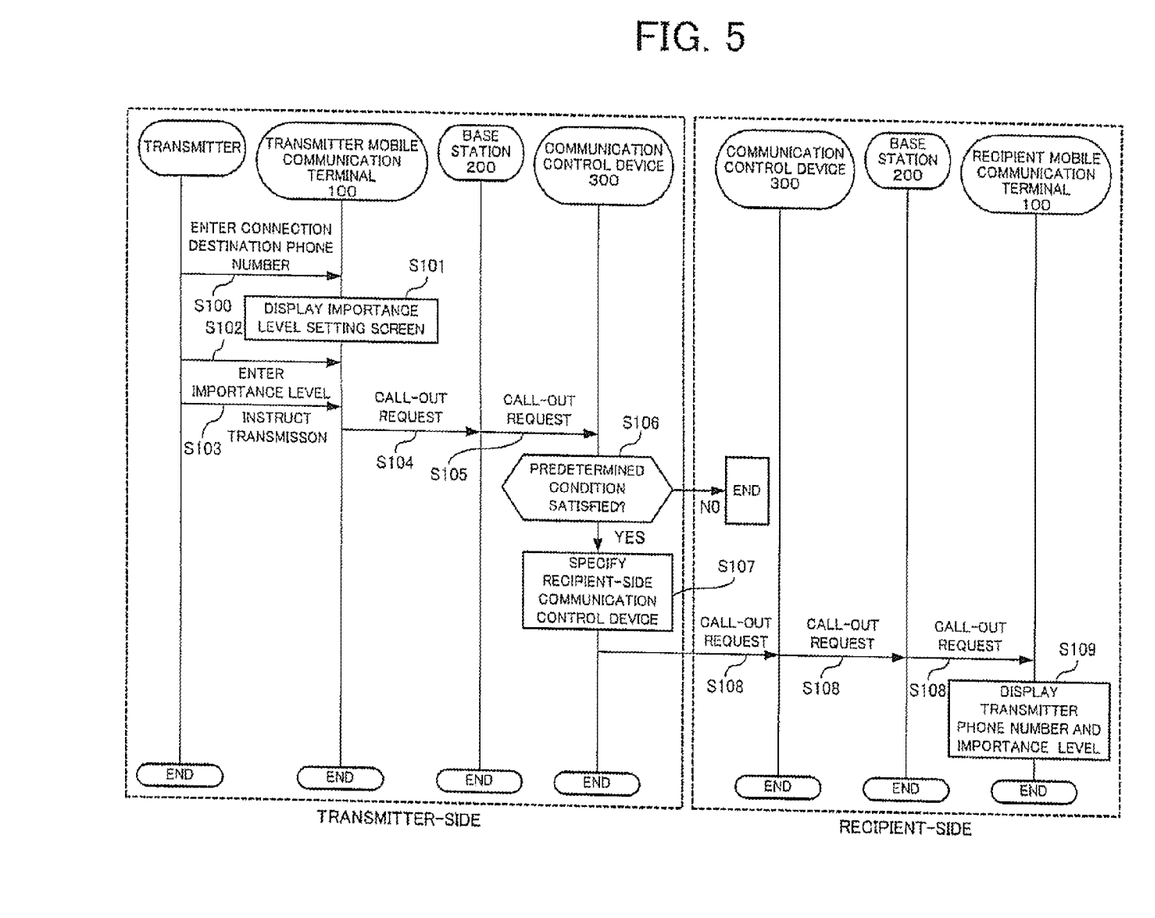
FIG. 5 is a flowchart showing the flow of a call process.

In the step S106 in FIG. 5, the communication control device 300 determines whether or not the transmitter mobile communication terminal 100 satisfies a predetermined condition. In accordance with the determination result, the communication control device 300 determines whether or not to execute the process of the step S107 and the process following to the step S107. The detail of the determination process in the step S106 will be explained with reference to FIG. 7.

Figure 7:
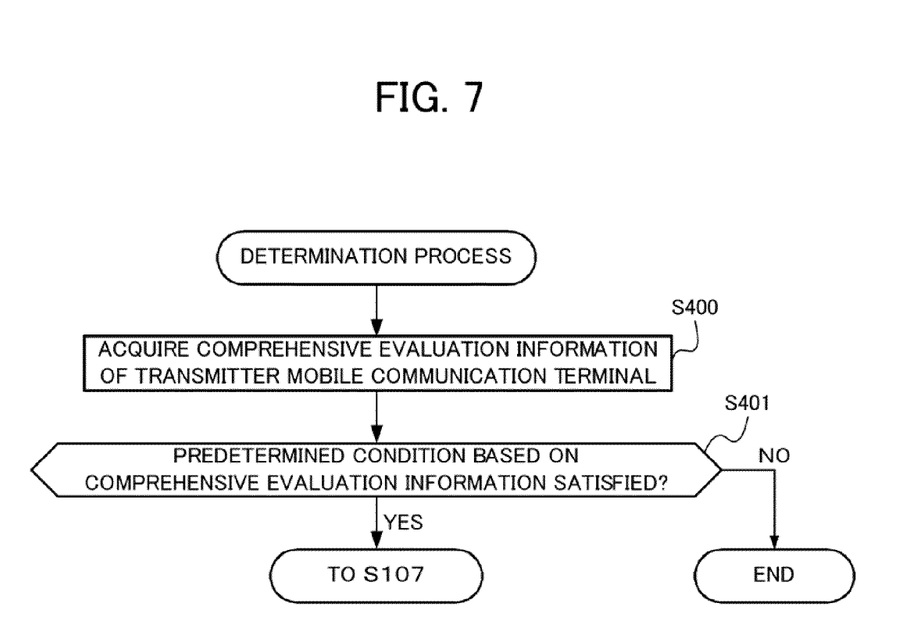
FIG. 7 is a flowchart for explaining a determination process by the communication control device.

The control unit 310 of the transmitter-side communication control device 300 first refers to the evaluation information DB 530, and acquires comprehensive evaluation information associated with the transmitter phone number (step S400). The control unit 310 of the transmitter-side communication control device 300 determines whether or not the transmitter mobile communication terminal 100 satisfies the predetermined condition based on the comprehensive evaluation information (step S401).

For example, when the comprehensive evaluation stored in the evaluation information DB 530 is greater than or equal to a predetermined threshold (e.g., greater than or equal to −2 points), the predetermined condition is satisfied (step S401: YES), and the process progresses to the step S107. Conversely, when the comprehensive evaluation is less than the predetermined threshold, the predetermined condition is not satisfied (step S401: NO), and the transmission process is terminated.

Note that when the comprehensive evaluation stored in the evaluation information DB 530 becomes less than the predetermined threshold, a mobile communication terminal 100 having a subscriber phone number associated with such a comprehensive evaluation becomes unable to make a transmission. Regarding such a mobile communication terminal 100, the comprehensive evaluation may be reset (e.g., set to zero) at a predetermined timing (e.g., every end of month). Accordingly, a mobile communication terminal 100 once becoming unable to make a transmission can be available from next month. However, in the next month, for example, regarding a transmission from such a mobile communication terminal 100, some penalties such that the predetermined threshold may be set lower and a high calling rate is applied may be given to the user of such a mobile communication terminal 100.

Through the foregoing processes, a transmission from a mobile communication terminal having a poor evaluation for importance level setting is limited. Accordingly, it becomes possible to prevent a transmitter from abusing importance level setting of a telephone call subject.

The embodiment of the present invention has been explained above, but the present invention is not limited to the foregoing embodiment, and can be changed and modified in various forms. The individual structural components of the foregoing embodiment may be freely combined together.

For example, in the foregoing embodiment, transmission is not limited unless the point of a comprehensive evaluation becomes less than the predetermined threshold. However, the number of times that calls can be made (hereinafter, "number of callable times") may be changed in accordance with the point of a comprehensive evaluation. That is, when the number of callable times is so set that the worse the evaluation is, the fewer the number of callable times is (the point of a comprehensive evaluation is lower and lower), it is expected that a prohibitive power against abusing of importance level setting will be created.

Figure 8A:
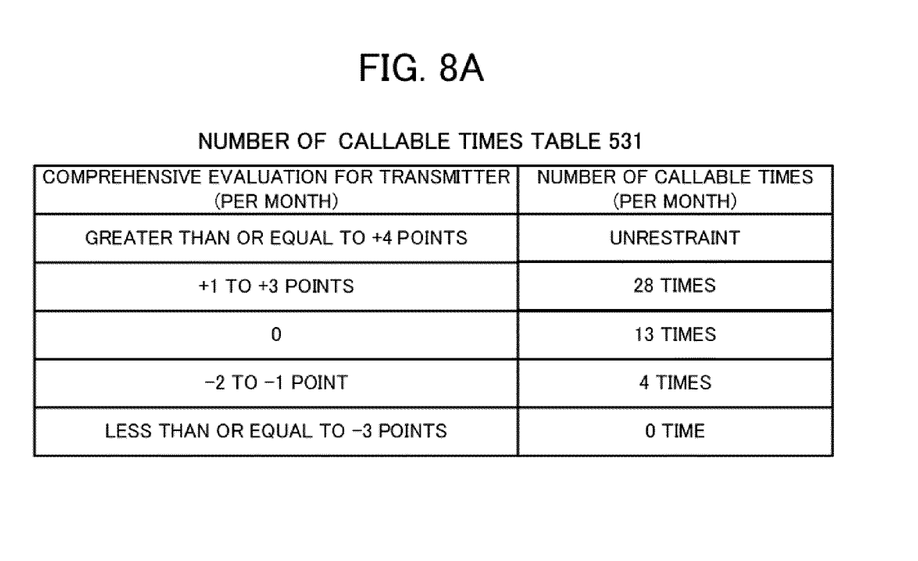
FIG. 8A is a diagram showing an example structure of a number of callable times table referred by the communication control device.

For example, as shown in FIG. 8A, the storage device 500 may store a number of callable times table 531 defining a number of callable times corresponding to a comprehensive evaluation. Moreover, the evaluation information DB 530 may store a number of times of making calls (hereinafter, "number of call-making times") in a predetermined period (e.g., latest month) in association with a phone number of a transmitter. For example, every time a transmission is made, the communication control device 300 increments the number of call-making times by 1 associated with the phone number of the transmitter in the evaluation information DB 530, thereby managing the number of call-making times.

In the step S106, the control unit 310 of a transmitter-side communication control device 300 refers to the evaluation information DB 530 to acquire the number of call-making times associated with the transmitter phone number and comprehensive evaluation information. Further, the control unit 310 of the transmitter-side communication control device 300 refers to the number of callable times table 531, and acquires the number of callable times corresponding to the content of the acquired comprehensive evaluation information. The control unit 310 of the transmitter-side communication control device 300 determines that a transmitter mobile communication terminal 100 satisfies the predetermined condition if the acquired number of call-making times is less than the number of callable times acquired from the table 531, and progresses the process to the step S107. Conversely, the control unit 310 of the transmitter-side communication control device 300 determines that the transmitter mobile communication terminal 100 does not satisfy the predetermined condition if the number of call-making times is greater than or equal to the number of callable times, and then terminates the process.

For example, in FIG. 8A, when a comprehensive evaluation is −1 point, a number of callable times is four from the number of callable times table 531. Accordingly, if the current number of call-making times of a transmitter is three or less than three, the predetermined condition is satisfied.

Like the foregoing embodiment, a number of callable times may be reset to a default number (e.g., a number corresponding to a comprehensive evaluation 0 point) when a predetermined period elapses (e.g., every one month). Alternatively, a number of callable times at a last month may be carried over a next month.

Figure 8B:
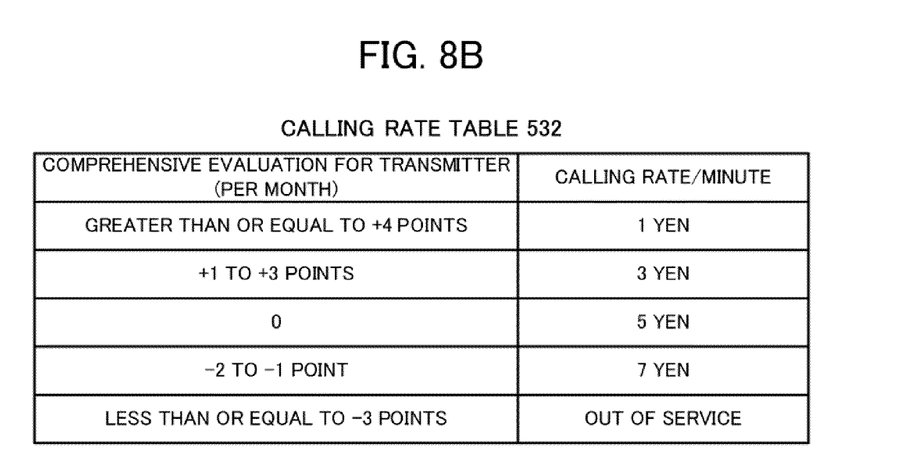
FIG. 8B is a diagram showing an example structure of a calling rate table referred by the communication control device.

When it is determined that a transmitter mobile communication terminal 100 satisfies the predetermined condition and the transmission process is then started, a calling rate for a transmitter may be set based on comprehensive evaluation information. For example, the control unit 310 of the communication control device 300 may refer to a calling rate table 532 shown in FIG. 8B to set the calling rate. In the example shown in FIG. 8B, when a comprehensive evaluation is −1 point, a calling rate is 7 YEN per minute. the better an evaluation is (i.e., the higher the point of a comprehensive evaluation is), the cheaper the calling rate becomes, and, the worse the evaluation is, the more expensive the calling rate becomes, so that it is expected that a prohibitive power against abusing of importance level setting is created.

In the foregoing embodiment, the explanation has been given of an example case where mobile communication terminals 100 of different carriers communicate with each other. However, the present invention can be applied to a case where mobile communication terminal 100 of the same carrier communicate with each other. In this case, a communication between the mobile communication terminals 100 of the same carrier can be processed as the communication control devices 300 in the same carrier communicate with each other.

In the foregoing embodiment, although the explanation has been given of the mobile communication terminal system as an example, the present invention can be applied to a fixed-line phone which enables importance level setting.

Moreover, in the foregoing embodiment, the explanation has been given of a case where a transmitter specifies an importance level for all telephone calls. However, a transmitter may optionally set an importance level (i.e., the transmitter may set an importance level or may not set it). In this case, a control target by the communication control device 300 may only be a transmission having a set importance level. For example, only for a transmission having a set importance level, a number of call-making times may be limited based on comprehensive evaluation information. For example, only for a transmission having a set importance level, a calling rate based on comprehensive evaluation information may be applied.

In the foregoing embodiment, various operation programs are stored in the communication control device, the information providing server and the storage device. However, a program for realizing the foregoing processing operation may be stored in a computer-readable recording medium, such as a flexible disk, a CD-ROM (Compact Disk Read-Only Memory), or an MO (Magneto-Optical disk), distributed, and installed in a computer to configure a device which executes the foregoing processing operation.

Such a program may be stored in a disk device or the like of a predetermined server device over a communication network like the Internet, and may be superimposed on a carrier wave, and a computer may download the program through its communication unit. Furthermore, the foregoing process can be realized by activating and running such a program while transferring it via a communication network.

When the foregoing function is realized by an OS or a cooperation of an OS and an application program, only a portion other than the OS may be stored in a medium and distributed, and may be downloaded by a computer.

The communication control device, the information providing server, and the storage device may be realized using exclusive hardwares.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A communication system comprising a communication control device which executes a predetermined process of calling out a recipient telephone device while specifying an importance level via a telephone network in response to a request from a transmitter telephone device, a storage device which is connected to the communication control device, and which is referred by the communication control device, and an information providing server which is connected to the storage device and which provides information to the storage device, wherein:

the information providing server is connected to the recipient telephone device via a data communication network;

the storage device stores information identifying the transmitter telephone device and transmitted from the information providing server, and evaluation information indicating an appropriateness of the importance level specified for a transmission from the transmitter telephone device, the information identifying the transmitter telephone device and the evaluation information being stored in association with each other;

the communication control device comprises:

a call-out request receiving unit which receives a call-out request from the transmitter telephone device, the call-out request including the importance level of a call subject and identification information identifying the transmitter telephone device and the recipient telephone device;

a determination unit which acquires the evaluation information associated with the identification information of the transmitter telephone device from the storage device, and determines whether or not the transmitter telephone device satisfies a predetermined condition based on the evaluation information; and a call-out process executing unit which executes, while specifying the importance level, a predetermined process of calling out the recipient telephone device identified by the identification information contained in the call-out request when it is determined that the transmitter telephone device satisfies the predetermined condition;

the information providing server comprises:

an evaluation information receiving unit which receives evaluation information indicating the appropriateness of the specified importance level and identification information identifying the transmitter telephone device from the recipient telephone device after the recipient telephone device responds to a call-out whose importance level is specified and a call is established; and an evaluation information transmitting unit which transmits the received evaluation information and the received identification information of the transmitter telephone device to the storage device; and the determination unit determines that the transmitter telephone device satisfies the predetermined condition when the appropriateness of the importance level specified for the transmission from the transmitter telephone device, the appropriateness being indicated by the evaluation information associated with the transmitter telephone device, is higher than a predetermined criterion.

2. A communication system comprising a communication control device which executes a predetermined process of calling out a recipient telephone device while specifying an importance level via a telephone network in response to a request from a transmitter telephone device, a storage device which is connected to the communication control device, and which is referred by the communication control device, and an information providing server which is connected to the storage device and which provides information to the storage device, wherein:

the information providing server is connected to the recipient telephone device via a data communication network;

the storage device stores information identifying the transmitter telephone device and transmitted from the information providing server, and evaluation information indicating an appropriateness of the importance level specified for a transmission from the transmitter telephone device, the information identifying the transmitter telephone device and the evaluation information being stored in association with each other;

the communication control device comprises:

a call-out request receiving unit which receives a call-out request from the transmitter telephone device, the call-out request including the importance level of a call subject and identification information identifying the transmitter telephone device and the recipient telephone device;

a determination unit which acquires the evaluation information associated with the identification information of the transmitter telephone device from the storage device, and determines whether or not the transmitter telephone device satisfies a predetermined condition based on the evaluation information; and a call-out process executing unit which executes, while specifying the importance level, a predetermined process of calling out the recipient telephone device identified by the identification information contained in the call-out request when it is determined that the transmitter telephone device satisfies the predetermined condition;

the information providing server comprises:

an evaluation information receiving unit which receives evaluation information indicating the appropriateness of the specified importance level and identification information identifying the transmitter telephone device from the recipient telephone device after the recipient telephone device responds to a call-out whose importance level is specified and a call is established; and an evaluation information transmitting unit which transmits the received evaluation information and the received identification information of the transmitter telephone device to the storage device;

the evaluation information is a value indicating the appropriateness of the importance level specified for the transmission from the transmitter telephone device, the value becoming larger as the appropriateness is higher; and the determination unit determines that the transmitter telephone device satisfies the predetermined condition when the evaluation information associated with the transmitter telephone device is greater than or equal to a predetermined threshold.

3. A communication system comprising a communication control device which executes a predetermined process of calling out a recipient telephone device while specifying an importance level via a telephone network in response to a request from a transmitter telephone device, a storage device which is connected to the communication control device, and which is referred by the communication control device, and an information providing server which is connected to the storage device and which provides information to the storage device, wherein:

the information providing server is connected to the recipient telephone device via a data communication network;

the storage device stores information identifying the transmitter telephone device and transmitted from the information providing server, and evaluation information indicating an appropriateness of the importance level specified for a transmission from the transmitter telephone device, the information identifying the transmitter telephone device and the evaluation information being stored in association with each other;

the communication control device comprises:

a call-out request receiving unit which receives a call-out request from the transmitter telephone device, the call-out request including the importance level of a call subject and identification information identifying the transmitter telephone device and the recipient telephone device;

a determination unit which acquires the evaluation information associated with the identification information of the transmitter telephone device from the storage device, and determines whether or not the transmitter telephone device satisfies a predetermined condition based on the evaluation information; and a call-out process executing unit which executes, while specifying the importance level, a predetermined process of calling out the recipient telephone device identified by the identification information contained in the call-out request when it is determined that the transmitter telephone device satisfies the predetermined condition;

the information providing server comprises:

an evaluation information receiving unit which receives evaluation information indicating the appropriateness of the specified importance level and identification information identifying the transmitter telephone device from the recipient telephone device after the recipient telephone device responds to a call-out whose importance level is specified and a call is established; and an evaluation information transmitting unit which transmits the received evaluation information and the received identification information of the transmitter telephone device to the storage device; and the storage device receives the evaluation information and the identification information of the transmitter telephone device both transmitted from the evaluation information transmitting unit, and updates the evaluation information stored in association with the received identification information of the transmitter telephone device based on the received evaluation information.

4. A communication system comprising a communication control device which executes a predetermined process of calling out a recipient telephone device while specifying an importance level via a telephone network in response to a request from a transmitter telephone device, a storage device which is connected to the communication control device, and which is referred by the communication control device, and an information providing server which is connected to the storage device and which provides information to the storage device, wherein:

the information providing server is connected to the recipient telephone device via a data communication network;

the storage device stores information identifying the transmitter telephone device and transmitted from the information providing server, and evaluation information indicating an appropriateness of the importance level specified for a transmission from the transmitter telephone device, the information identifying the transmitter telephone device and the evaluation information being stored in association with each other;

the communication control device comprises:
a call-out request receiving unit which receives a call-out request from the transmitter telephone device, the call-out request including the importance level of a call subject and identification information identifying the transmitter telephone device and the recipient telephone device;
a determination unit which acquires the evaluation information associated with the identification information of the transmitter telephone device from the storage device, and determines whether or not the transmitter telephone device satisfies a predetermined condition based on the evaluation information; and
a call-out process executing unit which executes, while specifying the importance level, a predetermined process of calling out the recipient telephone device identified by the identification information contained in the call-out request when it is determined that the transmitter telephone device satisfies the predetermined condition;
the information providing server comprises:
an evaluation information receiving unit which receives evaluation information indicating the appropriateness of the specified importance level and identification information identifying the transmitter telephone device from the recipient telephone device after the recipient telephone device responds to a call-out whose importance level is specified and a call is established; and
an evaluation information transmitting unit which transmits the received evaluation information and the received identification information of the transmitter telephone device to the storage device;
the storage device further stores a number of calls made by the transmitter telephone device in a predetermined period in association with identification information of the transmitter telephone device; and
the determination unit in the communication control device determines that the transmitter telephone device satisfies the predetermined condition when the stored number of calls made by the transmitter telephone device in the predetermined period does not reach a number of callable times of the transmitter telephone device in the predetermined period, the number of callable times being set based on the evaluation information.

5. A communication system comprising a communication control device which executes a predetermined process of calling out a recipient telephone device while specifying an importance level via a telephone network in response to a request from a transmitter telephone device, a storage device which is connected to the communication control device, and which is referred by the communication control device, and an information providing server which is connected to the storage device and which provides information to the storage device, wherein:
the information providing server is connected to the recipient telephone device via a data communication network;
the storage device stores information identifying the transmitter telephone device and transmitted from the information providing server, and evaluation information indicating an appropriateness of the importance level specified for a transmission from the transmitter telephone device, the information identifying the transmitter telephone device and the evaluation information being stored in association with each other;
the communication control device comprises:
a call-out request receiving unit which receives a call-out request from the transmitter telephone device, the call-out request including the importance level of a call subject and identification information identifying the transmitter telephone device and the recipient telephone device;
a determination unit which acquires the evaluation information associated with the identification information of the transmitter telephone device from the storage device, and determines whether or not the transmitter telephone device satisfies a predetermined condition based on the evaluation information; and
a call-out process executing unit which executes, while specifying the importance level, a predetermined process of calling out the recipient telephone device identified by the identification information contained in the call-out request when it is determined that the transmitter telephone device satisfies the predetermined condition;
the information providing server comprises:
an evaluation information receiving unit which receives evaluation information indicating the appropriateness of the specified importance level and identification information identifying the transmitter telephone device from the recipient telephone device after the recipient telephone device responds to a call-out whose importance level is specified and a call is established; and
an evaluation information transmitting unit which transmits the received evaluation information and the received identification information of the transmitter telephone device to the storage device;
in the communication control device, when the determination unit determines that the transmitter telephone device satisfies the predetermined condition, the call-out process executing unit applies a predetermined calling rate to a call from the transmitter telephone device, the calling rate being set based on the evaluation information.

* * * * *